United States Patent Office 3,784,701
Patented Jan. 8, 1974

3,784,701
COMPOSITIONS CONTAINING SUBSTITUTED BENZOYLPROPIONIC ACIDS AND METHOD OF USE TO TREAT INFLAMMATION AND PAIN
Andrew Stephen Tomcufcik, Old Tappan, N.J., and Ralph Grassing Child, Pearl River, and Adolph Edward Sloboda, New City, N.Y., assignors to American Cyanamid Company, Stamford, Conn.
No Drawing. Filed Sept. 21, 1970, Ser. No. 74,108
Int. Cl. A61k 27/00
U.S. Cl. 424—317                             3 Claims

ABSTRACT OF THE DISCLOSURE

Compositions of matter and method of use of compounds of the formula:

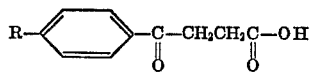

wherein R is phenyl, phenoxy, lower alkoxyphenyl, phenylmercapto or benzoyl. These compounds are useful for meliorating inflammation and pain in warm-blooded animals.

DESCRIPTION OF THE INVENTION

This invention relates to new compositions of matter and their use in meliorating inflammation and pain in warm-blooded animals. More particularly, it relates to compositions of derivatives of benzoylpropionic acid and a pharmaceutically acceptable carrier and their use as anti-inflammatory and analgesic agents.

The active components of the present compositions may be illustrated by the following formula:

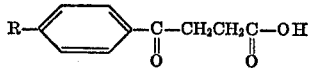

wherein R is phenyl, phenoxy, loweralkoxyphenyl, phenylmercapto and benzoyl, and salts thereof which include salts such as sodium, calcium and also pharmaceutically acceptable amine salts such as ethanolamine, tris(hydroxymethyl)methylamine and the like. The term lower alkoxy is intended to cover those having 1 to 4 carbon atoms which includes methoxy, ethoxy, propoxy, isopropoxy, butoxy and isobutoxy.

The preparation of the active components of the present compositions are described in the chemical literature and in the examples hereinafter.

The substituted benzoylpropionic acids of this invention are highly active as anti-inflammatory agents in meliorating inflammation and pain in warm-blooded animals. They are useful in doses which range from about 5 to 250 mg. per kilogram per day of warm-blooded animals. The preferred range of dose is usually from 5 to 50 mg. per kilogram per day.

The components of the present compositions such as, 3-(4-biphenylcarbonyl)propionic acid also show immunological activity. For example, it is well known that if rabbit antiserum to sheep erythrocytes is injected into the skin of a guinea pig, a hemorrhagic lesion results and should the injection be given intravenously, death from "heterophil shock" results (Redfern W. W., Am. J. Hyg., 6, 276 (1926)). Both of these phenomena are complement-dependent as described by Glovsky et al., J. Immunol., 102, 1 (1969) and Becker et al., Textbook of Immunopathology, Miescher and Muller-Eberhard (ed.), Grune and Stratton, New York, 1968, p. 77. On the other hand, 3-(4-biphenylcarbonyl)propionic acid when administered under appropriate conditions, protects guinea pigs from each of these challenges.

The active components of the present compositions are nearly colorless crystalline solids only slightly soluble in water, but readily soluble in solvents such as methanol, ethanol, propylene glycol, and the like. The salts are soluble in water and in hydroxylic solvents.

For therapeutic administration the active substituted benzoylpropionic acids of this invention may be incorporated with excipients and used, for example, in the form of tablets, dragees, capsules, suppositories, liquids, elixirs, emulsions, suspensions, syrups, chocolate, candy, wafers, chewing gum, solutions for parenteral administration, or the like. Such compositions and preparations should contain at least 0.1% of active substituted benzoylpropionic acid or salt. The percentage in the compositions and preparations may, of course, be varied, and may conveniently be between about 2% and 60% or more of the weight of the unit. The amount of active benzoylpropionic acid, in such therapeutically useful compositions or preparations is such that a suitable dosage will be obtained. This dosage can also be obtained by the use of sustained release preparations. Preferred compositions or preparations according to the present invention are prepared so that a dosage unit form contains between about 1 and about 250 milligrams of the active benzoylpropionic acid.

Tablets pills, dragées, and the like may contain the following: a binder such as gum tragacanth, acacia, corn starch, or gelatin; a distintegrating agent such as corn starch, potato starch, alginic acid, or the like; a lubricant such as stearic acid, magnesium stearate, talc, or the like; a sweetening agent such as sucaryl or saccharin may be added, as well as a flavoring such as peppermint, oil of wintergreen or cherry flavoring.

In determining the acute anti-inflammatory activity of the present compounds Royal Hart, Wistar strain rats ranging from 80 to 90 g. were used. The rats were fasted overnight prior to dosing but had free access to water. The drugs in aqueous suspension were administered by gavage in a volume of 1.7 ml./50 g. rat (corresponds to hydration volume used by Winter et al., Proc. Soc. Exp. Biol. & Med., 111, 544–547, 1962).

The phlogistic agent used was carrageenin prepared as a sterile 1% suspension in 0.9% sodium chloride for routine testing. A volume of .05 ml. was injected through a 26 gauge needle into the plantar tissue of the right hind paw. Measurements were made 5 hours after drug administration (4 hours after carrageenin challenge) unless otherwise indicated.

Volumes of both the normal and carrageenin inflamed feet were determined. The difference between the two measurements was considered to be the increased edema due to the carrageenin administration. Results were expressed as a C/T efficacy ratio (edema of control animals/ edema of treated animals). The following Table I summarizes the results.

TABLE I

[The effects of anti-inflammatory agents on carrageenin induced deema of the rat paw [1] (pooled data)]

| Treatment | Dose, mg./kg.[2] | Number rats | Ratio control/ treated edema |
|---|---|---|---|
| Controls | | 64 | |
| Aspirin | 250 | 32 | 2.8 |
| | 83 | 32 | 1.4 |
| | 27 | 32 | 1.2 |
| | 9 | 32 | .9 |
| | 3 | 32 | 1.0 |
| Phenylbutazone | 250 | 32 | 2.3 |
| | 83 | 32 | 2.4 |
| | 27 | 32 | 1.7 |
| | 9 | 32 | 1.3 |
| | 3 | 32 | 1.3 |
| 3-(biphenylcarbonyl)propionic acid | 250 | 24 | 1.8 |
| | 83 | 16 | 1.8 |
| | 27 | 16 | 1.6 |
| | 9 | 16 | 1.4 |
| 3-(4-phenoxybenzoyl)propionic acid | 250 | 2 | 1.1 |
| 3-[4-(4-methoxyphenyl)benzoyl] propionic acid | 250 | 8 | 1.7 |
| 3-(4-benzoylbenzoyl)propionic acid | 250 | 8 | 2.2 |
| 3-(4-phenylmercaptobenzoyl) propionic acid | 250 | 8 | 1.7 |

[1] Rats fasted overnight prior to testing.
[2] Measurements made 5 hours after oral administration.

The compounds of the present invention are active analgesics when measured by the "writhing syndrome" test for analgesic activity as described by Siegmund et al., Proceedings of the Society for Experimental Biology and Medicine, vol. 95, p. 729 (1957), with modifications. This method is based upon the reduction of the number of writhes following the intraperitoneal injection of one mg./kg. of body weight of phenyl p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl p-quinone. The test compound is administered orally to groups of two mice each 30 minutes before injection of the phenyl p-quinone. The total number of writhes exhibited by each group of mice is recorded for a 3 minute period commencing 15 minutes after injection of the phenyl p-quinone. A compound is considered active if it reduces the total number of writhes in two test mice from a control value of approximately 30 per pair to a value of 18 or less. The following Table II summarizes the relative activity of the present components as active analgesics.

TABLE II

| Compound | Oral dosage, mg./kg. | Number of writhes per 3 minute period | |
|---|---|---|---|
| | | Pair 1 | Pair 2 |
| 3-(4-biphenylcarbonyl)propionic acid | 200 | 4 | 3 |
| 3-(4-phenoxybenzoyl)propionic acid | 100 | 3 | 13 |
| 3-[4-(4-methoxyphenyl)benzoyl]propionic acid | 100 | 13 | 3 |
| 3-(4-benzoylbenzoyl)propionic acid | 100 | 6 | 5 |
| 3-(4-phenylmercaptophenyl)propionic acid | 100 | 10 | 7 |
| Controls | | 31 | 31 |

SPECIFIC DESCRIPTION

The following examples describe in detail the synthesis of active components of the present invention, descriptions and results of tests using the present components and formulations of various types of pharmaceutical preparations.

EXAMPLE 1

Preparation of 3-(4-biphenylcarbonyl)propionic acid 135 grams of aluminum chloride is dissolved in 500 ml. of nitrobenzene, the solution being held below 10° C. by external cooling. A finely ground mixture of 50 g. of succinic anhydride and 75 g. of biphenyl is added to the stirred solution, the temperature being held below 10° C. It is then held at room temperature for four days. After pouring the reaction mixture into a solution of 150 ml. of concentrated hydrochloric acid in 1 liter of ice water, the nitrobenzene is removed by steam distillation. The solid is collected, dissolved in 4 liters of 3% hot sodium carbonate solution, clarified, and reprecitated by the addition of excess 6 N sulfuric acid solution. The crude product is collected, dried, and recrystallized from ethanol to give the pure subject compound, melting point 185–187° C. Hey and Wilkinson, J. Chem. Soc., 1940, p. 1030 give a melting point of 185° C.

EXAMPLE 2

Preparation of 3-(4-phenoxybenzoyl)propionic acid

A stirred mixture of 17 g. of diphenyl ether, 10 g. of succinic anhydride, and 100 ml. of benzene is treated with 27 g. of aluminum chloride in small portions. After addition is completed, the mixture is heated at reflux for two hours, cooled, and poured into 150 ml. of concentrated hydrochloric acid. The benzene is removed by steam distillation. The precipitate present is collected, washed with water, and then redissolved in 700 ml. of water containing 10 g. of sodium carbonate. Reacidification with concentrated hydrochloric acid gives the pure compound, melting point 117–119° C.; lit. melting point 118–119° C. The subject compound is prepared essentially as described by Huang-Minlon, J. Am. Chem. Soc., 68, 2487 (1946).

EXAMPLE 3

Preparation of 3-[4-(4-methoxyphenyl)benzoyl]propionic acid

The subject compound is prepared as described by L. F. Fieser and C. K. Bradsher, J. Am. Chem. Soc., 58, 1738 (1936), which employs the general procedure of Example 1. The isolated crude product is recrystallized from ethanol to give the pure compound melting at 195° C.; lit. melting point 193–195° C.

EXAMPLE 4

Preparation of 3-(4-benzoylbenzoyl)propionic acid

The compound 3-(4-benzylbenzoyl)propionic acid (prepared as described by Cook et al., J. Chem. Soc., 1939, 266), 5.36 grams, is dissolved in 150 ml. of glacial acetic acid containing 1.9 ml. of concentrated sulfuric acid. 10.4 grams of sodium dichromate dihydrate is added, and the mixture stirred and heated at 40°–60° C. for four hours. After cooling to room temperature, the mixture is clarified and diluted to one liter with cold water. The precipitated solid is collected, washed free of color with water, and dried. It is dissolved in 50 ml. of hot methylene chloride and then diluted with 150 ml. of hexane. Cooling at −10° C. gives 2.6 grams of pure product, melting point 125°–127° C.

*Analysis.*—Calcd. for $C_{17}H_{14}O_4$ (percent): C, 72.33; H, 5.00. Found (percent): C, 72.33; H, 5.02.

EXAMPLE 5

Preparation of 3-(4-phenylmercaptobenzoyl)propionic acid

A mixture of 55.8 grams of diphenyl sulfide, 30 grams of succinic anhydride, and 400 ml. of benzene is stirred at room temperature, and 100 grams of aluminum chloride added in portions during 30 minutes. The mixture is then stirred at reflux for three hours, cooled, and added to one liter of ice water containing 400 ml. of concentrated hydrochloric acid. The benzene is removed by steam distillation. The precipitate is collected, dried, and recrystallized from 750 ml. of benzene to give 64.6 grams of the pure compound, melting at 143°–145° C.

*Analysis.*—Calcd. for $C_{16}H_{14}O_3S$ (percent): C, 67.12; H, 4.93; S, 11.18. Found (percent): C, 67.30; H, 4.87; S, 11.21.

EXAMPLE 6

The effect of present compounds on body temperature in yeast induced pyrexia was determined by the following procedure. Groups of three Wistar strain rats (Royal Hart) weighing 80±5 g. were injected subcutaneously in the nape of the neck with 0.6 ml. of a 40% suspension of dried brewer's yeast in distilled water. Test compounds were suspended in a 1.5% buffered starch solution and administered at various doses by gavage 17 hours post challenge. Control rats were treated in a similar manner but were given only the buffered starch solution. At 19 hours post challenge the rectal temperature of each rat was measured with an electric thermometer. Each dose response experiment was replicated one or more times. The following Table III summarizes the results.

TABLE III

[The effect of test drugs on the body temperature or normal and pyretic rats]

| Treatment | Oral dose, mg./kg. | Normal rats No. | Normal rats Body temp., °C. | Rats with yeast induced pyresis No. | Rats with yeast induced pyresis Body temp., °C. | Effective dose, mg./kg.[1] |
|---|---|---|---|---|---|---|
| Control | | 30 | 36.8 | 156 | 39.3 | |
| Aspirin | 250 | 4 | 37.0 | 15 | [2] 36.8 | |
|  | 83 | 4 | 37.1 | 15 | [2] 37.1 | |
|  | 27 | 4 | 36.8 | 15 | [2] 37.2 | 78 |
|  | 9 | 4 | 37.0 | 15 | [2] 37.5 | |
|  | 3 | | | 6 | [3] 38.1 | |
| Phenylbutazone | 250 | 4 | 36.8 | 15 | [2] 36.8 | |
|  | 83 | 4 | 37.0 | 15 | [2] 37.0 | |
|  | 27 | 4 | 36.9 | 15 | [2] 37.2 | 90 |
|  | 9 | 4 | 36.6 | 15 | [2] 37.3 | |
|  | 3 | | | 15 | [3] 37.7 | |
| 3-(4-biphenyl-carbonyl)pro-pionic acid. | 250 | 8 | [2] 36.3 | 6 | [2] 36.7 | |
|  | 83 | 8 | 37.0 | 6 | [2] 37.2 | |
|  | 27 | 8 | 36.9 | 6 | [2] 37.6 | 135 |
|  | 9 | 8 | 36.8 | 6 | [2] 37.6 | |
|  | 3 | 8 | | 6 | [3] 37.7 | |

[1] Dose estimated to reduce temperature to 37° C.
[2] Significantly lower than normal control temperature. p=<.05 by t test.
[3] Significantly lower temperature than pyretic controls. p=<.05 by t test.

EXAMPLE 7

In order to test erythema in albino guinea pigs (Lederle breeding colony) they were depilitated on their flanks, the evening before testing, with a standard mixture of barium sulfide and gum acasia. On the morning of testing, groups of four guinea pigs were dosed by gavage one hour prior to ultraviolet exposure (−1 hour). At 0 hour they were restrained in a plastic container which allows exposure of 3 circular spots. They were then exposed to ultraviolet irradiation from a "Hanovia" Kromayer lamp model 10 for 60 seconds. At +1 and +4 hours the degree of erythema for each of the three sites was assessed according to the following scoring system: 0=no erythema, 0.5=incomplete circle or faint erythema and 1.0=complete circle of distinct erythema. Thus, the maximum score for each animal was 3.0. The following Table IV summarizes the results.

TABLE IV

[The effect of anti-inflammatory agents on development of erythema in guinea pigs (pooled data)]

| Treatment | Dose, mg./kg.[1] | Score (avg.) 1 hr. | Score (avg.) 4 hr. | Dead G.P./ total | Decision |
|---|---|---|---|---|---|
| Control | | 2.1 | 2.8 | 4/384 | |
| Aspirin | 250 | .1 | 1.2 | 7/88 | |
|  | 125 | .1 | 2.0 | 1/16 | A |
|  | 62.5 | .8 | 2.0 | 2/11 | A |
|  | 31.3 | 1.2 | 2.3 | 0/12 | A |
|  | 250 | 0 | .5 | 2/60 | A |
| Phenylbutazone | 125 | .1 | 1.1 | 0/16 | A |
|  | 62.5 | .3 | .9 | 1/12 | A |
|  | 31.3 | .4 | 1.7 | 1/12 | A |
|  | 15.6 | 1.1 | 2.3 | 0/8 | A |
|  | 7.8 | | 2.9 | 0/8 | A |
|  | 250 | 0 | 1.8 | 0/8 | A |
| 3-(4-biphenylcarbonyl) propionic acid | 125 | .1 | 1.3 | 0/8 | A |
|  | 62.5 | 0 | 1.9 | 0/6 | A |
|  | 31.3 | 0 | 2.2 | 0/8 | A |
|  | 15.6 | .1 | 2.3 | 0/8 | A |
|  | 7.8 | .9 | 2.3 | 0/8 | A |
|  | 3.9 | 1.7 | 2.3 | 0/8 | |

[1] Oral administration.
A=Active (discriminant function analysis).

EXAMPLE 8

Tests to show activity against chronic anti-inflammation in adjuvant arthritis were carried out. Groups of three Royal Hart Wistar strain rats, weighing 200±10 g. each were injected intradermally in the right hind paw with Freund's adjuvant (dried human tubercle bacilli in a mineral oil vehicle) at a dose of 2 mg./kg. of body weight. Test compounds were administered orally in a 1.5% starch vehicle at the indicated dosage in mg./kg. of body weight once daily on days 0 through 13 post-challenge. Control rats were treated in a similar manner, but given starch vehicle instead of the test compound. On the 14th and 21st day post-challenge the diameter of the injected paw (primary lesion) is measured by micrometer caliper, the volumes of inflamed paws are estimated from these measurements, and the results are expressed as percent inhibition of swelling as compared to controls at the same time, the other inflamed sites, such as ears, paws and tail (secondary lesions) are observed and the rat graded as to degree of inflammation and swelling present. The grading is based on a scale of 0 to 24.0, where 0 represents a complete absence of induced arthritic modules and 24.0 represents the maximum degree of inflammation. The mean grade for each treated group is calculated and the effects of each compound were expressed as percent inhibition of the control grade. The following Table V summarizes the results.

TABLE V

[The effect of anti-inflammatory agents on adjuvant arthritis of rats (treatment day 0 to day 13)]

| Treatment | Oral dose, mg./kg./day | Dead/treated at 21 days | Mean weight gain (gms.) Day 14 | Mean weight gain (gms.) Day 21 | Percent inhibition of swelling (primary lesion) Day 14 | Percent inhibition of swelling (primary lesion) Day 21 | Percent inhibition of score (secondary lesion) Day 14 | Percent inhibition of score (secondary lesion) Day 21 |
|---|---|---|---|---|---|---|---|---|
| Normal rats | | 4/51 | [1] 69 | [1] 110 | | | | |
| Adjuvant controls | | 21/234 | 36 | 39 | 0 | 0 | 0 | 0 |
| Phenylbutazone | 150 | 0/18 | 45 | 50 | [1] 80 | 44 | [1] 52 | [1] 31 |
|  | 75 | 2/18 | [1] 57 | 54 | [1] 72 | [1] 23 | [1] 24 | 11 |
|  | 37.5 | 2/18 | 47 | 50 | [1] 67 | 19 | 12 | [1] 14 |
| Aspirin | 400 | 4/18 | 48 | 57 | [1] 76 | [1] 68 | [1] 52 | [1] 48 |
|  | 200 | 1/18 | 31 | 27 | [1] 51 | [1] 36 | 14 | [1] 18 |
|  | 100 | 7/18 | 42 | 49 | [1] 40 | [1] 21 | [1] 19 | 7 |
| 3-(4-biphenylcarbonyl) propionic acid | 50 | 8/24 | [1] 19 | 44 | [1] 69 | [1] 55 | [1] 53 | [1] 39 |
|  | 25 | 2/12 | 32 | 56 | [1] 76 | [1] 45 | [1] 44 | [1] 26 |
|  | 12.5 | 2/12 | 34 | 38 | [1] 54 | 23 | 13 | 3 |

[1] Significantly different from adjuvant controls (p=<.05 by t test).

EXAMPLE 9

Experiments were conducted to determine analgesia by a modification of the method of Randall and Selitto (Arch. Int. Pharmacodyn, 111:409–419, 1957). This method was used to measure the pain threshold of rats whose paws were made sensitive to pressure by injection of a 20% aqueous suspension (0.1 ml.) of brewer's yeast into the plantar surface of the left hind paw. The pressure in mm. Hg which, when applied to the inflamed paw, elicited a sudden struggle or vocalization was recorded. A maximum (cut-off) pressure of 300 m. Hg was employed. Control rats respond at a pressure of about 100–120 mm. Hg. The following Table VI summarizes the results.

pended in 600 ml. of water, and heated with stirring, to form a paste. This paste is then used to granulate the mixed powders. Additional water is used, if necessary. The wet granules are passed through a #8 hand screen and dried at 120° F. The dry granules are then passed through a #16 screen. The mixture is lubricated with 1% magnesium stearate and compressed into tablets in a suitable tableting machine.

TABLE VI

[Analgesic potency and efficacy in the inflamed rat paw]

| Agent | Route | No. rats used (dose levels) | Post-treatment/pre-treatment ratio of pressure to react | | | Rank order [1] potency | Efficacy (overall) |
|---|---|---|---|---|---|---|---|
| | | | 1.5 | 2.0 | 2.5 | | |
| | | | mg./kg. | | | | |
| Aspirin | I.P. | 40 (4) | 50 | 200 | | 3 | 2 |
| | P.O. | 48 (5) | 100 | >400 | | 3 (3) | 2 (3) |
| Phenylbutazone | I.P. | 50 (5) | 20 | 40 | >100 | 2 | 2 |
| | P.O. | 48 (5) | 50 | 150 | >400 | 2 (2) | 1 (2) |
| 3-(4-biphenylcarbonyl)propionic acid | I.P. | 56 (5) | 10 | 40 | 100 | 1 | 1 |
| | P.O. | 60 (4) | 30 | 90 | >200 | 1 (1) | 1 (1) |

[1] Rank order for potency estimated from the doses required to attain a ratio of 1.5. Order for efficacy estimated from the highest ratio attainable. >Indicates the highest dose tested at which the indicated ratio was not attained.

NOTE.—Pre-treatment pressure thresholds were determined 2 hours after brewers' yeast. Post-treatment recordings were made 3 hours after the yeast (1 hour after agent). There was 8–10 rats at every dose level (3–6) for each agent studied. A ratio of post-pretreatment pressure threshold of >1.36 is significant at p=0.05.

Using the procedure described in this example and determining the pressure-pain threshold ratio at periods from ½ to 48 hours following the administration of 200 mg./kg. orally the following results were obtained.

TABLE VII

[Ratio of treated/control pressure-pain threshold]
Treatment (200 mg./kg. orally)

| Hours after treatment | Aspirin | Phenylbutazone | 3-(4-biphenyl-carbonyl)-propionic acid |
|---|---|---|---|
| ½ | | 1.9 | 1.7 |
| 1 | 1.2 | 2.8 | 1.9 |
| 2 | 1.2 | 2.6 | 2.7 |
| 3 | 1.7 | 3.2 | 4.3 |
| 4 | 1.7 | 3.2 | 3.9 |
| 6 | 1.1 | 1.1 | 3.7 |
| 8 | | | 4.3 |
| 18 | | | 3.1 |
| 24 | | | 3.6 |
| 30 | | | 3.2 |
| 48 | | | 1.7 |

Analgesic Action [1] (Duration) in the Inflamed (Brewer's yeast) Rat Paw.

The prolonged activity of the present compounds over aspirin and phenylbutazone is shown in the above Table VII.

EXAMPLE 10

Preparation of 50 mg. tablets

Per tablet, g.:　　　　　　　　　or 10,000 tablets, g.
```
  0.050  3-(4-biphenylcarbonyl)propionic acid__  500
  0.080  Lactose _____  800
  0.010  Corn starch (for mix) _____  100
  0.010  Corn starch (for paste) _____   75
  ─────                                       ─────
  0.148                                        1475
   .002  Magnesium stearate (1%) _____   15
  ─────                                       ─────
  0.150                                        1490
```

The active ingredient, lactose and corn starch (for mix) are blended together. The corn starch (for paste) is sus-

[1] Analgesia is considered to be present when the T/C ratio 1.5. There were at least 8 rats tested for each time period.

EXAMPLE 11

Preparation of oral syrup

Active ingredient:　　　　　　　　　　　　Amount
```
  3-(4-biphenylcarbonyl) propionic acid ___mg__  500
  Sorbitol solution (70% N.F.) _____ml__   40
  Sodium benzoate _____mg__  150
  Saccharin _____mg__   10
  Red dye (F. D. & C. No. 2) _____mg__   10
  Cherry flavor _____mg__   50
  Distilled water, q.s. ad 100 mg.
```

The sorbitol solution is added to 40 ml. of distilled water and the active ingredient is suspended therein. The saccharin, sodium benzoate, flavor and dry are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite mgma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 12

Preparation of parenteral solution

In a solution of 700 ml. of propylene glycol and 200 ml. of water for injection is dissolved 20.0 g. of 3-(4-biphenylcarbonyl) propionic acid with stirring. After dissolution is complete, a solution of 5 g. of 2-aminoethanol in 20 ml. of water for injection is then added to the formulation. The pH of this solution is then adjusted to 5.5 with hydrochloric acid and the volume is made up to 1000 ml. with distilled water. The formulation is filtered through a 0.22 micron sterilizing filter, filled into 5.0 ml. ampoules each containing 2.0 ml. (representing 40 mg. of drug) and sealed under nitrogen.

What is claimed is:

1. A method of meliorating inflammation and pain in a warm-blooded animal which comprises administering internally to said warm-blooded animal an amount effective as an anti-inflammatory and anti-pain agent of a phenylbenzoylpropionic acid compound of the formula:

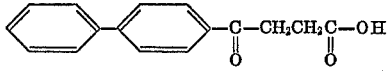

or a pharmaceutically acceptable salt thereof in association with a pharmaceutically acceptable carrier.

2. A method in accordance with claim 1, in which the daily dosage of phenylbenzoyl propionic acid is from about 5 to 250 milligrams per kilogram of body weight of the warm-blooded animal.

3. A method of alleviating pain in a warm-blooded animal which comprises administering internally to said warm-blooded animal an amount effective as an anti-pain agent of 3-(4-biphenylcarbonyl)propionic acid or a pharmaceutically acceptable salt thereof in association with a pharmaceutically acceptable carrier.

References Cited

FOREIGN PATENTS 881,544  9/1971  Canada.
    56  2/1965  Eire.

OTHER REFERENCES

J. Am. Chem. Soc., 68, pp. 2487–2488 (1946).
J. Am. Chem. Soc., 58, pp. 1738–1741 (1936).
J. Chem. Soc., p. 1030 (1940).
J. Chem. Soc., pp. 266–268 (1939).

STANLEY J. FRIEDMAN, Primary Examiner

UNITED STATES PATENT OFFICE
CERTIFICATE OF CORRECTION

Patent No. 3,784,701      Dated January 8, 1974

Inventor(s) Andrew Stephen Tomcufcik, Ralph Grassing Child and Adolph Edward Sloboda It is certified that error appears in the above-identified patent and that said Letters Patent are hereby corrected as shown below:

Column 3, Table I in the title, please change "deema" to read -- edema --.

Column 5, Table III, line 22 under heading "Body temp., °C." please change "39.3" to read -- 38.3 --.

Signed and sealed this 23rd day of April 1974.

(SEAL)
Attest:

EDWARD M. FLETCHER, JR.       C. MARSHALL DANN
Attesting Officer      Commissioner of Patents